(12) United States Patent
Ouellette et al.

(10) Patent No.: US 6,439,192 B1
(45) Date of Patent: Aug. 27, 2002

(54) GASEOUS AND LIQUID FUEL INJECTION VALVE WITH CONCENTRIC NEEDLES

(75) Inventors: Patric Ouellette; Alain M. J. Touchette; Guowei Li; Silviu Dumitrescu, all of Vancouver (CA)

(73) Assignee: Westport Research Inc., Vancouver (CA)

( * ) Notice: Subject to any disclaimer, the term of this patent is extended or adjusted under 35 U.S.C. 154(b) by 4 days.

(21) Appl. No.: 09/695,163

(22) Filed: Oct. 24, 2000

(51) Int. Cl.$^7$ ................................................ F02M 21/02
(52) U.S. Cl. ........................................ 123/299; 123/525
(58) Field of Search ................................ 123/299, 525, 123/295, 300, 468, 575, 27 GE, 490; 239/398, 408, 409, 410

(56) References Cited

U.S. PATENT DOCUMENTS

| | | | |
|---|---|---|---|
| 5,996,558 A | * 12/1999 | Quellette et al. | 123/506 |
| 6,073,862 A | 6/2000 | Touchette et al. | 239/408 |
| 6,202,601 B1 | * 3/2001 | Quellette et al. | 123/27 GE |

OTHER PUBLICATIONS

Hiroyasu et al., "Empirical Equations for the Sauter Mean Diameter of a Diesel Spray," *SAE Technical Paper Series 890464*, Feb., 1989.

Ouellette et al., "Numerical Simulations of Directly Injected Natural Gas and Pilot Diesel Fuel in a Two–Stroke Compression Unit Engine," *SAE Technical Paper Series 981400*, May, 1998.

Li et al., "Optimization Study of Pilot–Ignited Natural Gas Direct–Injection in Diesel Engines," *SAE Technical Paper Series 1999–01–3556*, Oct., 1999.

Dumitrescu et al., "Effects of Injection Changes on Efficiency and Emission of a Diesel Engine Fueled by Direct Injection of Natural Gas," *SAE Technical Paper Series 2000–01–1805*, Jun., 2000.

\* cited by examiner

Primary Examiner—Willis R. Wolfe
Assistant Examiner—Mahmoud Gimie
(74) Attorney, Agent, or Firm—McAndres, Held & Malloy, Ltd.

(57) ABSTRACT

A gaseous and liquid fuel injection valve for an internal combustion engine comprises an injection valve body that houses two separate concentric fuel injection valve assemblies. The first valve assembly is a pilot fuel needle valve assembly, which comprises a first needle movable in the direction of the longitudinal axis of the body between an open and a closed position. The second valve assembly is a gaseous fuel needle valve assembly, which comprises a second needle movable in the direction of the longitudinal axis between an open and a closed position. The gaseous fuel needle valve assembly controls the injection of gaseous fuel into the combustion chamber through a plurality of gaseous fuel holes formed in a nozzle tip of the gaseous fuel needle valve assembly. At least one of the nozzle tips is rotatable to thereby change the position of the pilot fuel holes with respect to the gaseous fuel holes. The number of the plurality of pilot fuel holes is different from the number of the plurality of gaseous fuel holes.

16 Claims, 5 Drawing Sheets

Angle= 0.0            Angle= 15.0           Angle= 30.0

GASEOUS AND LIQUID FUEL INJECTION VALVE WITH CONCENTRIC NEEDLES

FIELD OF THE INVENTION

The present invention relates to a novel nozzle hole arrangement for a gaseous and liquid fuel injection valve with concentric needles for an internal combustion engine.

BACKGROUND OF THE INVENTION

The United States Environmental Protection Agency proposes that by the year 2004, it will require heavy-duty diesel engines to reduce their oxides of nitrogen (NOx) emissions by 50% from the legislated 1998 4.0 g/bhp.hr to 2.0 g/bhp.hr and with no increase over the 1998 particulate matter legislated level set at 0.1 g/bhp.hr. There is also pressure to reduce carbon dioxide emissions from engines to reduce the global greenhouse effect. However, diesel engines have high thermal efficiency and have an advantage of emitting very low levels of hydrocarbons and carbon monoxide. Accordingly, diesel engines are expected to remain the dominant heavy-duty transport power plant.

Engine manufacturers are researching ways to reduce diesel engine emissions while maintaining performance, power, and efficiency. For example, manufacturers are researching methods adapting diesel engines to use natural gas as fuel in substitution for diesel fuel. Compared to diesel fuel, natural gas is a cleaner burning fuel. The main constituent of natural gas is methane, which, with respect to diesel, has higher heating value, lower adiabatic flame temperature and simpler molecular structure. Compared to the refining processes employed to produce petroleum products, such as diesel fuel, less processing is required to prepare natural gas for consumption in an internal combustion engine. An additional benefit of using natural gas is that it is abundantly available on all continents. Other gaseous fuels, such as propane and hydrogen are also cleaner burning compared to diesel fuel and may also be substituted for diesel fuel to yield reduced emissions. Accordingly, it will be understood that references herein to "gaseous fuel" refer to all such cleaner burning fuels.

A number of different methods are being researched to allow gaseous fuels to be substituted for diesel fuel in compression ignition engines. For example, some natural gas fuelled engines use a method known as "fumigation" wherein the natural gas is introduced into the combustion chamber with the intake air. Such engines may use a spark plug or an injection of pilot fuel to initiate combustion. A problem with fumigation is that to avoid engine knock, a compromise must be made at high loads by limiting at least one of engine compression ratio or fuel quantity. Another compromise is typically required at low loads, in that the intake air may need to be throttled to ensure that the fuel to air ratio is sufficient to support combustion. These compromises result in a reduced thermal efficiency and reduced torque at low speed, compared to a comparable conventional diesel-fuelled engine.

Another method of substituting gaseous fuel for diesel fuel in a compression ignition engine employs High Pressure Direct Injection (HPDI) of the gaseous fuel. In this method, gaseous fuel at approximately 200 bar is injected directly into the engine combustion chamber at the end of the compression process. A few crank angle degrees earlier, a small amount of pilot fuel is injected into the engine combustion chamber. The pilot fuel is a fuel that auto-ignites more readily than the gaseous fuel. For example, the pilot fuel may be diesel fuel or dimethylether (DME). The pilot fuel autoignites and then ignites the gaseous fuel. The engine can keep the same compression ratio as its original diesel counterpart because there is no knock limitation. In addition, there is no need for throttling. The thermal efficiency is thereby maintained.

One approach to implementing HPDI in a compression ignition engine employs at least two separate fuel injection valves, requiring at least two mounting ports in the cylinder head. This approach has additional development costs associated with designing and manufacturing a new cylinder head, adding significantly to the cost of making new engines or retrofitting existing diesel-fuelled engines. Costs and modifications necessary to convert a conventional diesel engine to an HPDI engine can be reduced by employing a gaseous and liquid fuel injection valve that fits into the same mounting port as a conventional diesel injection valve. Conventional diesel engines and HPDI engines may then share the same cylinder head.

A gaseous and liquid fuel injection valve controls the separate and sequential injection of the pilot fuel and gaseous fuel into the engine cylinder through a different series of holes in separate concentric nozzle tips. Such an injection valve is disclosed in U.S. Pat. No. 6,073,862 ("the '862 patent"), which is incorporated herein by reference in its entirety. In preferred designs of the fuel injection valve, the pilot fuel injection valve body is the inner valve assembly and the gaseous fuel injection valve is concentrically arranged in the annular space around the pilot fuel injection valve. The nozzles of early injection valves comprised six equally spaced pilot fuel holes and six equally spaced gaseous fuel holes. One aspect of the preferred arrangement is that the pilot fuel injection valve body is free to rotate around its longitudinal axis. Compared to an assembly that is not allowed to rotate, a freely rotating inner needle valve assembly is a simpler design that is easier and less expensive to make. For large bore engines with many cylinders, a freely rotating valve assembly is more desirable compared to a needle with its holes in a fixed orientation because it is preferable to be able to tune each engine cylinder individually. That is, the same hole orientation may not be optimized for each and every cylinder.

A problem observed with HPDI engines employing concentric gaseous and liquid fuel injection valves is that when the engine operates at medium and light loads there can be a periodic variation in engine speed and NOx emissions. The amplitude of these variations can be particularly large when the load is small. These unstable conditions can lead to uncontrollable overspeeding and halting (that is, engine stalling). Accordingly, there is a need to prevent such unstable conditions. The same problem was not observed when the same engine was run with conventional fuel injection valves and using only diesel fuel. Various aspects of the engine design were studied to determine the cause for the unstable conditions, including the design of a gaseous and liquid fuel injection valve.

SUMMARY OF THE INVENTION

An improved gaseous and liquid fuel injection valve comprises:

(a) an injection valve body;
(b) a pilot fuel needle valve assembly disposed within the body, the pilot fuel needle valve assembly comprising a first needle movable in the direction of the longitudinal axis of the body between an open and a closed position for controlling injection of pilot fuel into a combustion chamber of the engine through a plurality of pilot fuel holes formed in a nozzle tip of the pilot needle valve assembly;

(c) a gaseous fuel needle valve assembly disposed within the body and concentric with the pilot fuel needle valve assembly, the gaseous fuel needle valve assembly comprising a second needle movable in the direction of the longitudinal axis between an open and a closed position for controlling the injection of gaseous fuel into the combustion chamber through a plurality of gaseous fuel holes formed in a nozzle tip of the gaseous fuel needle valve assembly.

At least one of the nozzle tips is rotatable to thereby change the position of the pilot fuel holes with respect to the gaseous fuel holes, and the number of the plurality of pilot fuel holes is different from the number of the plurality of gaseous fuel holes.

Preferably, the plurality of gaseous fuel injection holes number N and the plurality of pilot fuel injection holes number M, where N and M do not have any common factors other than one. Additionally, it is preferable for at least one of N or M to be a prime number. To improve the contact between the burning pilot fuel or the burned products and the gaseous fuel jets, it is preferable for N and M to be about the same in number, without being equal in number. Preferably the absolute value of N–M is equal to one, two, three or four, such as, for example, when N is 7 and M is 6, or when N is 8 and M is 7.

Another consideration in determining the preferred number of pilot fuel holes and gaseous fuel holes is the statistically calculated variance from the average value of the angle between the centerlines of the gaseous fuel holes and pilot fuel holes. Preferably, this variance is less than about 0.4 degree$^2$, and more preferably, less than about 0.2 degree$^2$.

The pilot fuel holes and the gaseous fuel holes are preferably equally spaced around the circumference of the respective nozzle tips. In a preferred embodiment, the gaseous fuel needle valve assembly occupies an annular space formed between the body and the pilot fuel needle valve assembly. In this embodiment, the pilot fuel needle valve assembly may preferably comprise an outer housing that is movable within the body and operates as the second needle for the gaseous fuel needle valve assembly.

To control the sequential injection of pilot fuel and gaseous fuel, the pilot fuel needle valve assembly and the gaseous fuel needle valve assembly are preferably independently operable. Such an arrangement allows pilot fuel and gaseous fuel to be injected at different times, directly from the respective valve assemblies into the combustion chamber.

In a preferred arrangement the first needle is movable to the open position by moving in an inward direction away from the nozzle tip and the combustion chamber. Similarly, the second needle is preferably movable to the open position by moving in an inward direction away from the nozzle tip and the combustion chamber.

BRIEF DESCRIPTION OF THE DRAWINGS

The drawings illustrate specific embodiments of the invention but should not be considered as restricting the spirit or scope of the invention in any way.

DETAILED DESCRIPTION OF PREFERRED EMBODIMENTS(S)

Figure 1:
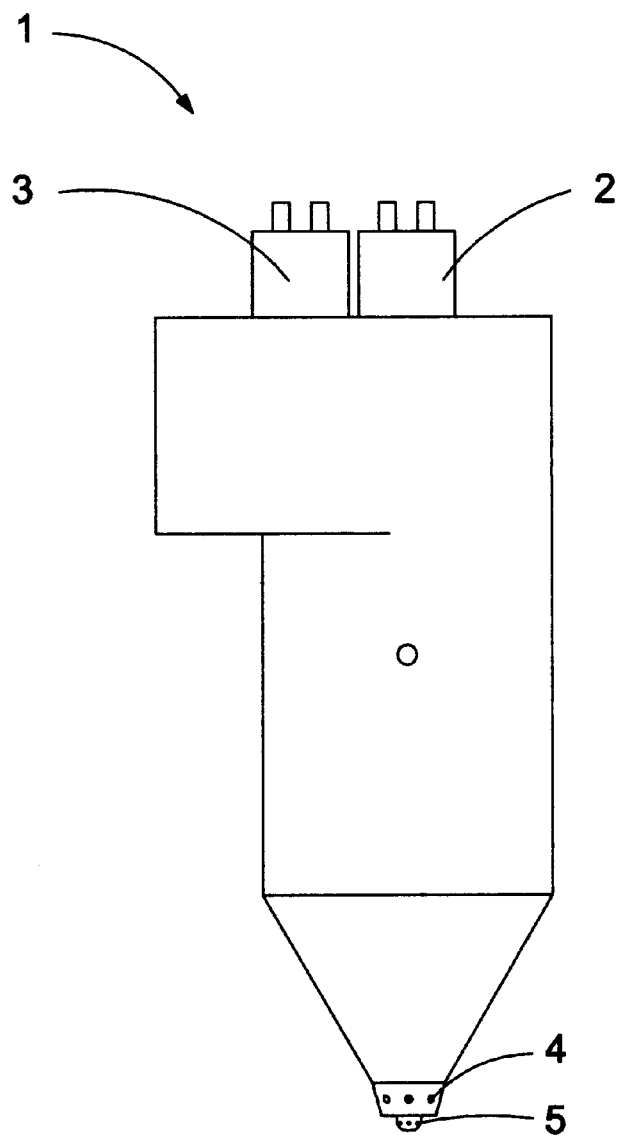
FIGS. 1 and 2 illustrate front and side elevation views of a double solenoid gaseous and liquid fuel injection valve.
Figure 2:
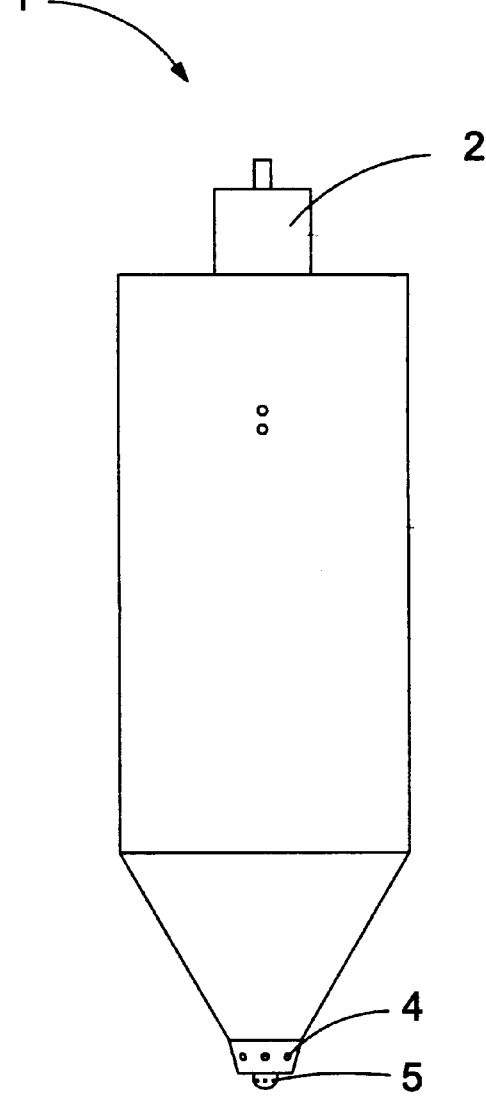

Referring to the drawings, FIGS. 1 and 2 show front and side elevation views of a gaseous and liquid fuel injection valve. In the illustrated embodiment two electrically operated electronically controlled valves are used, one to control the injection of the pilot fuel and one to control the injection of the main gaseous fuel. Specifically, FIG. 1 shows a front view of the exterior of gaseous and liquid fuel injection valve 1, with dual solenoids 2 and 3 at the top. Gaseous fuel holes 4 are disposed around the circumference of the nozzle tip of the gaseous fuel injection valve assembly, which in this embodiment is an extension of the outer valve body. Liquid (pilot) fuel holes 5 are disposed around the circumference of the nozzle tip of the pilot fuel injection valve assembly, which in the illustrated embodiment is concentric with the gaseous fuel injection valve assembly and extends through a circular opening in the nozzle tip thereof. In the illustrated embodiment, there are six equally spaced gaseous fuel holes 4 and six equally spaced pilot fuel holes 5.

FIG. 1 shows a pilot fuel needle valve assembly that is movable along the longitudinal axis of injection valve 1, and that functions as the needle for the gaseous fuel injection valve assembly. That is, the pilot fuel injection valve assembly retracts into the valve body to lift away from the gaseous fuel injection valve seat to permit gaseous fuel to be injected through gaseous fuel holes 4. FIG. 2 illustrates a side view of gaseous and liquid fuel injection valve 1 with solenoid 2 at the top.

Simulation models and experiments were conducted to investigate the ignition and combustion mechanisms in an engine with an injection valve generally of the type illustrated in FIGS. 1 and 2 (that is, a gaseous and liquid fuel injection valve with a gaseous fuel injection valve nozzle tip in a fixed position relative to a freely rotating pilot fuel injection valve nozzle tip). Since the pilot fuel injection valve assembly rotates during engine operation, the injection interlace angle also changes during operation. The injection interlace angle is defined herein as the angle between the axes of the gaseous fuel jet and that of the pilot fuel spray, as viewed in the direction of the injection valve's longitudinal axis. When the injection valve has the same number of equally spaced pilot fuel holes and gaseous fuel holes (as in the embodiment shown in FIGS. 1 and 2), the injection interlace angle between a given gaseous fuel jet and the closest pilot fuel spray is the same angle for all of the gaseous fuel jets and their respective closest pilot fuel sprays. When the injection valve has an unequal number of equally spaced pilot fuel holes and gaseous fuel holes, the injection interlace angle varies between adjacent pairs of gaseous fuel jets and pilot fuel sprays. Accordingly, when there is an unequal number of gaseous and pilot fuel holes, the injection interlace angle is calculated as an average angle.

Figure 3:
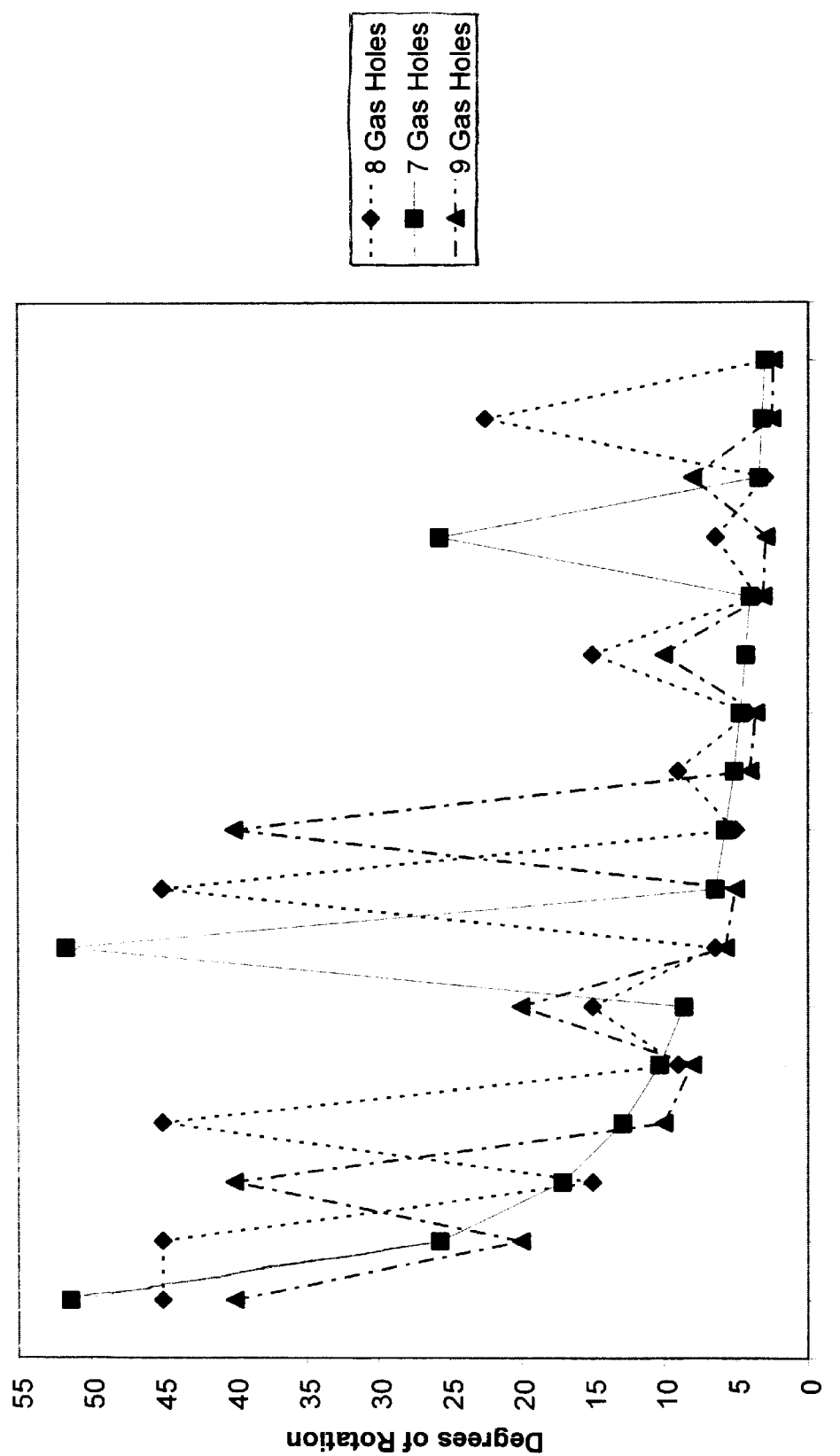
FIG. 3 is a plot of the number of degrees of rotation between identical configurations as a function of the number of pilot fuel holes, for three cases, namely when there are seven, eight, or nine gaseous fuel holes.

One approach to determining the preferred number of gaseous fuel holes and pilot fuel holes is to determine the number of degrees the rotating needle valve needs to rotate before an identical hole configuration is reached. The lower the number of degrees of rotation, the less variability there is in the number of different configurations. For example, since the holes are equally spaced, if there are seven gaseous fuel holes and six pilot fuel holes, the same configuration is provided when any one of the gaseous fuel holes is aligned with one of the pilot fuel holes. FIG. 3 is a plot of the number of degrees of rotation between identical configurations as a function of the number of pilot fuel holes. This plot shows that the number of degrees of rotation generally decreases as the number of holes increases. However, this plot also shows that there are exceptions to this general trend in that there is a sharp increase in the number of degrees of rotation when the number of gaseous fuel holes and the number of pilot fuel holes have a common factor. For example, when three pilot fuel holes are paired with nine gaseous fuel holes, three is a common factor of both three and nine so the number of degrees of rotation between identical configurations is relatively high. Similarly, the degrees of rotation between identical configurations is more than twice as much for a pairing of six pilot fuel holes with nine gaseous fuel holes, compared to six pilot fuel holes paired with seven gaseous fuel holes. One of the worst cases is when there are an equal number of gaseous fuel holes and pilot fuel holes.

Persons skilled in the art involved here will recognize that there are other factors that must be considered in determining the preferred number of holes. For example, the size of the engine and the quantities of fuel to be injected influence how much total open hole area is required. Since there are practical limits on the size of holes that can be machined, there are upper limits on the number of holes that can be used. Also since it is desirable for each gaseous fuel jet to be near a pilot fuel spray there is a preference for the number of gaseous fuel and pilot fuel holes to be about equal, without being equal. That is, when the number of holes in each nozzle is less than ten, the difference between the number of pilot fuel holes and gaseous fuel holes is preferably one or two. As the number of holes increase, as for example, for larger injection valves for larger engines, the difference between the number of pilot fuel holes and gaseous fuel holes may be greater with less effect on performance.

The KIVA-II code that originates from the Los Alamos National Laboratory in the United States was the basis for three-dimensional numerical simulations. This code was modified to change the inflow boundary condition for the gas injection, which is usually under expanded flow and not included in KIVAII inflow boundary conditions. The combustion subroutine in KIVAII was also modified to handle the combustion of two fuels and application of spray correlated Sauter mean diameter distribution for initial spray size conditions. The three dimensional numerical simulation model is described in more detail in the following papers, each of which is incorporated herein by reference in its entirety: (1) "Optimization Study of Pilot-Ignited Natural Gas Direct-Injection in Diesel Engines", SAE 99FL-474, by Guowei Li, Patric Ouellette, Silviu Dumitrescu, and Philip G. Hill; (2) "Numerical Simulations of Directly Injected Natural Gas and Pilot Diesel Fuel in a Two-Stroke Compression Ignition Engine", SAE 981400, by Patric Ouellette, Peter Mtui and Philip G. Hill; and (3) "Empirical Equations for the Sauter Mean Diameter of a diesel Spray", SAE 890464, by H. Hiroyasu, M. Arai and M. Tabata.

A cylinder sector of 60 degrees was set up for computation using the numerical simulation. The simulated injection valve comprised pilot fuel and gaseous fuel holes that were equally spaced around the circumference of the concentric nozzle tips. The model employed an axisymmetrical piston bowl geometry. A periodic treatment can be implemented and computation in a sector can represent the whole cylinder computation. A grid of $35*12*43$ (radial*axial*circumferential) was employed. Three-dimensional computations were carried out to study the effect of injection interlace angle on combustion in this sector for the low and high load conditions set out in Table 1 below.

TABLE 1

| Parameter | Light Load | High Load |
|---|---|---|
| Load as Percentage of Maximum | 25% | 100% |
| Speed | 1200 rpm | 1200 rpm |
| Load (BMEP) | 2.17 bar | 8.95 bar |
| Start Of Injection of diesel | −6 degrees after TDC | −6 degrees after TDC |
| Start Of Injection of natural gas (Estimated) | 0 degrees after TDC | 0 degrees after TDC |

Figure 4:
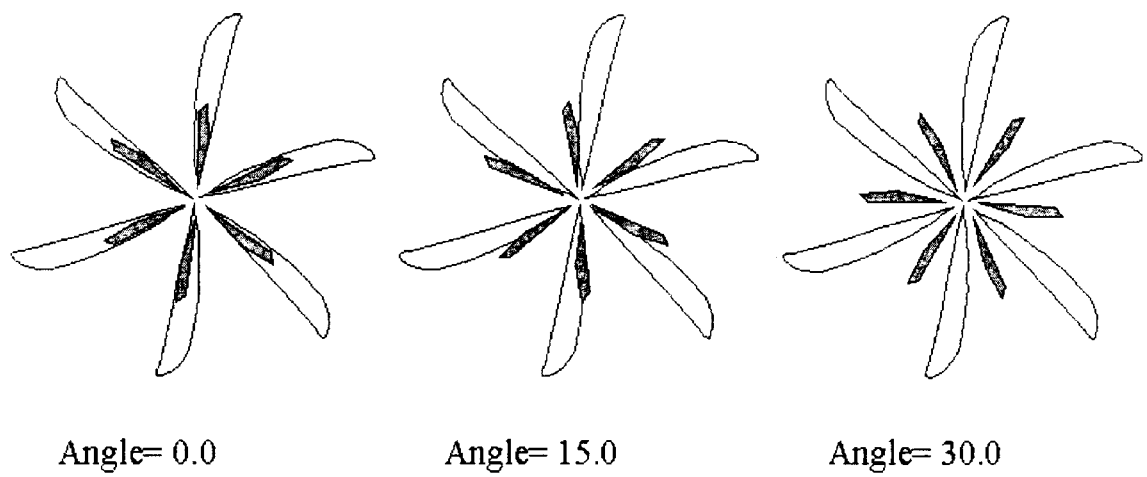
FIG. 4 is a schematic illustration of three pilot fuel spray and gaseous fuel jet configurations corresponding to different relative rotations of the pilot fuel holes.

The first injection valve modeled with the numerical simulation had six pilot fuel holes and six gaseous fuel holes. As pilot fuel holes rotate relative to the gaseous fuel holes during engine operation, for an injection valve with six equally spaced holes, injection interlace angles between zero and thirty degrees represent all possible orientations since sixty degrees is the angle between the centerlines of adjacent holes and the configurations repeat after the half-way point (at thirty degrees). Three cases were studied with injection interlace angles of zero, fifteen, and thirty degrees, as shown schematically in FIG. 4. The computed temperature contours in the engine cylinder confirmed the process of igniting a gaseous fuel with a more auto-ignitable pilot fuel. Since gaseous fuel typically has a low cetane number, it is ignited by the hot flame of the burning pilot fuel, or by its burned products, not by auto-ignition. Distribution and evolution of the pilot fuel vapor with respect to the gaseous fuel jet plays a key role in ignition of the gaseous fuel.

Figure 5:
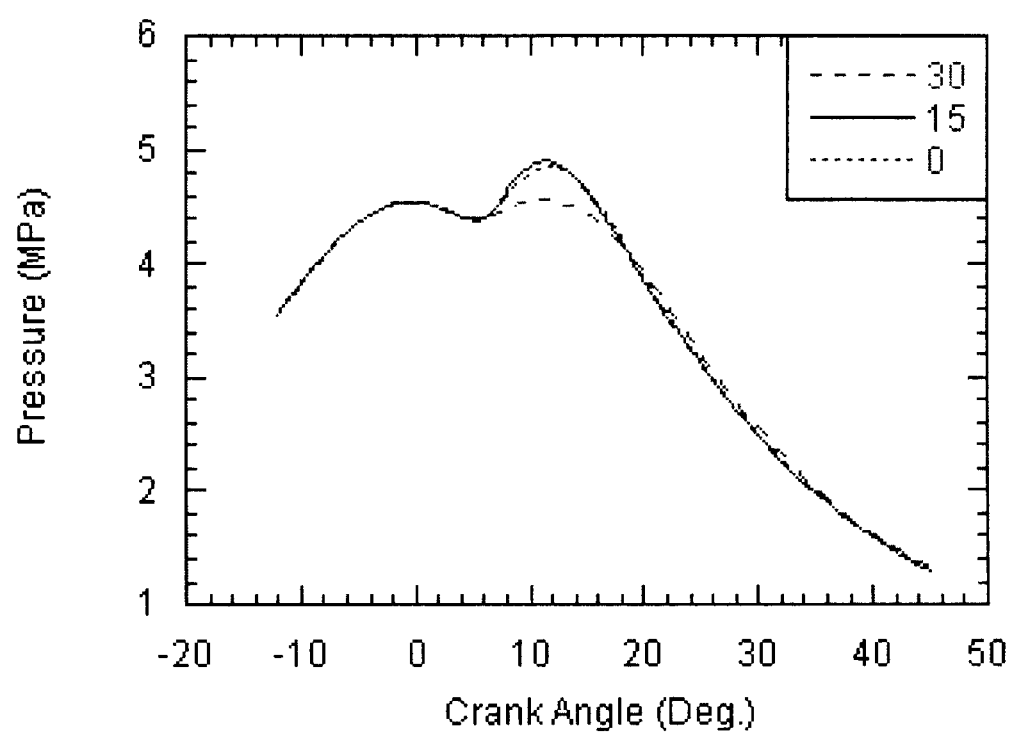
FIG. 5 is a comparison of the pressure traces for different pilot fuel hole positions relative to the gaseous fuel holes plotted with data obtained from simulation models.

For the light load operation described in Table 1, the simulated cylinder pressure curves for the interlace angles of zero, fifteen, and thirty are plotted in FIG. 5. From this plot, it can be seen that when the interlace angle is thirty degrees the combustion is the worst. Combustion pressure traces plotted for an interlace injection of fifteen and zero degree are close. This suggests that changing interlace angle can significantly affect peak cylinder pressure and engine output at light load and that an optimum interlace angle exists.

Figure 6:
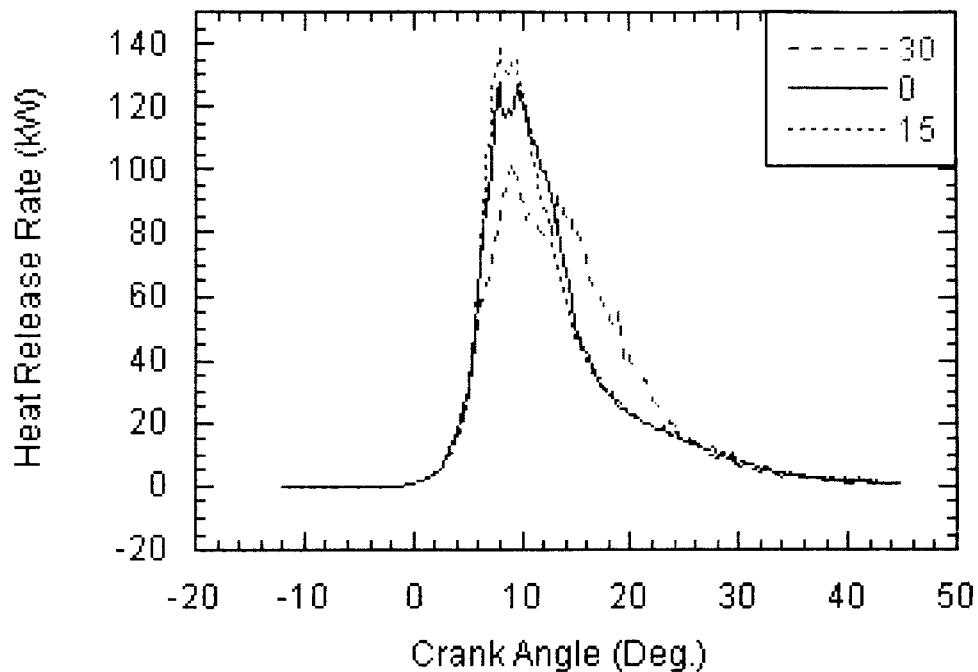
FIG. 6 is a comparison of the heat release rates for different pilot fuel hole positions relative to the gaseous fuel holes plotted with the data obtained from simulation models.

For the same light load condition, the corresponding heat release rates are shown in FIG. 6. The heat release rate when the interlace angle is thirty degrees is much lower than the heat release rate when the interlace angle is zero or fifteen degrees.

The numerical simulation showed that changes in the interlace angle can affect combustion, and can be a cause of periodic unstable conditions. Further, the interlace angles which have the most detrimental effect on engine performance is the angle when there is the least contact between the burning pilot fuel or the burned combustion products and the gaseous fuel jet. Accordingly, the injection valve can be modified to increase the amount and probability of having an optimum interlace angle between pilot fuel sprays and gaseous fuel jets by employing an unequal number of gaseous fuel holes and pilot fuel holes.

A statistical analysis was employed to determine the desired number of gaseous fuel holes for a given number of pilot fuel holes. When the number of gaseous fuel holes and pilot fuel holes are unequal and the holes are evenly spaced, the relative angle of one gaseous fuel jet to the closest pilot fuel spray determines the interlace angles of all of the other gaseous fuel jets in relation to respective closest pilot fuel sprays. Assuming six diesel holes are used and that the gas hole number is N, the average value of angles is then given by equation (1) below, $$g(\theta) = \frac{1}{N} \sum_{n=1}^{N} f\left(\theta + \frac{360}{N}(n-1)\right) \quad (1)$$

where "f" is a function as defined in equation (2) below:

$$f(\phi) = \phi - 60 \cdot n \quad (2)$$

when $$n \cdot 60 \leq \phi \leq \left(n + \frac{1}{2}\right) \cdot 60 \quad (3)$$

$$f(\phi) = 60 + 60 \cdot n - \phi \quad (4)$$

when $$\left(n + \frac{1}{2}\right) \cdot 60 \leq \phi \leq (n+1) \cdot 60 \quad (5)$$

where $\phi$ is the interlace angle for the reference gaseous fuel jet and $\theta$ is a random variable with a probability density function of normal distribution as expressed by equation (6) below:

$$\Phi(\theta) = 1./360. \quad (6)$$

The expected value E and variance $\sigma^2$ of the average value of angles can thus be estimated accordingly to equations (7) and (8) shown below:

$$E = \int g(\theta) \cdot \Phi(\theta) \cdot d\theta \quad (7)$$

$$\sigma^2 = \int (g(\theta) - E)^2 \cdot \Phi(\theta) \cdot d\theta \quad (8)$$

The values for E and variance $\sigma^2$ are shown in Table 2 below, calculated for a few different numbers of gaseous fuel holes, combined with six pilot fuel holes.

TABLE 2

| Number of Gaseous Fuel Holes | Number of Pilot Fuel Holes | Expected value (degree) | Variance $\sigma^2$ (degree$^2$) |
|---|---|---|---|
| 5 | 6 | 15 | .346 |
| 6 | 6 | 15 | 8.660 |
| 7 | 6 | 15 | .176 |
| 8 | 6 | 15 | .000 |
| 9 | 6 | 15 | .307 |

Table 2 shows that when the number of pilot fuel holes is fixed, the expected value of the average angle is fifteen degrees despite the number of gaseous fuel holes. Since there is no change in the expected average angle, it is surprising that there is such a significant change in variance $\sigma^2$ of the average value of angles as shown in Table 2.

In particular, variance $\sigma^2$ is much greater when the number of gaseous fuel holes equals the number of pilot fuel holes, or when the number of gaseous fuel holes is a multiple of the number of diesel fuel holes (or vice versa). The bigger the value of variance $\sigma^2$, the wider the interlace angle change can be. To reduce periodic unstable engine conditions, it is desirable to reduce the value of variance $\sigma^2$ to less than 0.4 degree$^2$ and preferably less than 0.2 degree$^2$, such as in the case when there are seven gaseous fuel holes and six pilot fuel holes.

Experimental Results

Experiments were performed to validate the results of the numerical simulation models. The engine used in the experiments was a Detroit Diesel Corporation two-stroke single cylinder DDC 1-71 engine. The engine was equipped with a gaseous and liquid fuel injection valve for high pressure direct injection of pilot fuel at or near top dead center, followed by an injection of gaseous fuel directly into the combustion chamber. The pilot fuel was No. 2 diesel fuel and the gaseous fuel was natural gas. Some of the relevant engine specifications are disclosed in Table 3 below:

TABLE 3

| Engine Model | DDC 1-71 |
|---|---|
| Engine Type | Two-stroke, roots blower uniflow scavenging |
| Number of Cylinders | 1 |
| Bore (Diameter) and Stroke | 108.0 × 127.0 mm |
| Connecting Rod Length | 254 mm |
| Displacement | 1.162 Liters |
| Compression Ratio | 16.0 to 1 |
| Rated Power | 11.2 kW @ 1200 RPM |
| Rated Brake Mean Effective Power (BMEP) | 4.8 bar @ 1200 RPM |
| Rated Peak Torque | 76 NM @ 1200 RPM |
| Intake Port Closure | 132 Degrees BTDC |
| Exhaust Valve Opening | 94.5 Degrees ATDC |

Figure 7:
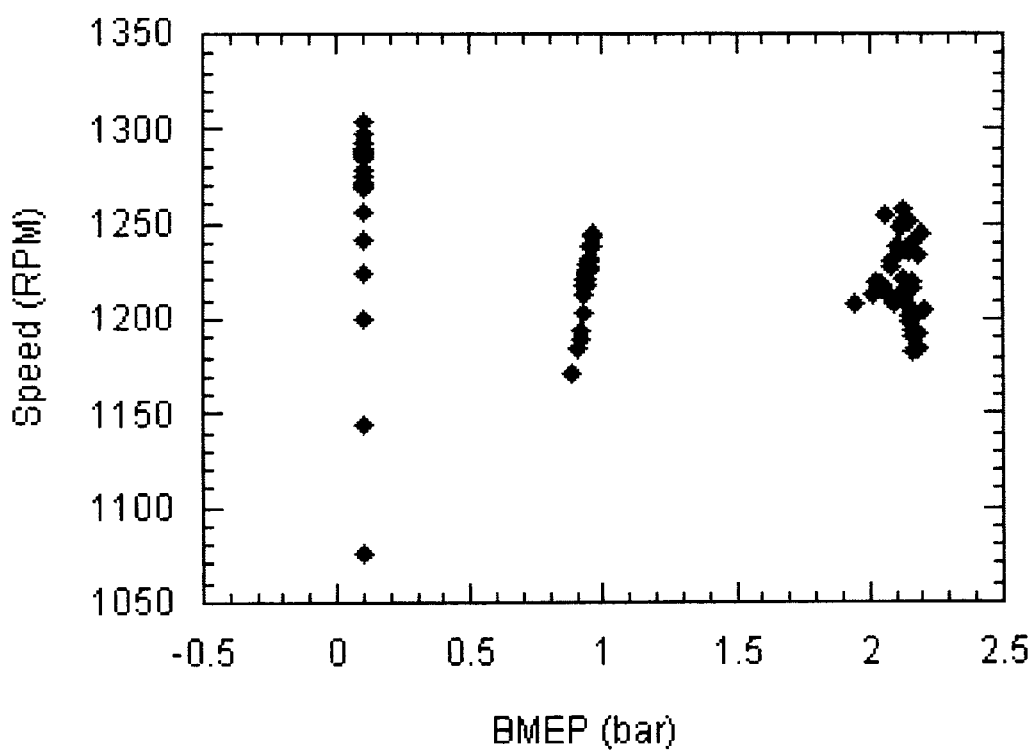
FIG. 7 is a plot of engine speed as a function of load for an engine employing an injection valve with six pilot fuel holes and six gaseous fuel holes plotted with the data obtained from experimental results.

When the DDC 1-71 engine was operated using an injection valve with six pilot fuel holes and six gaseous fuel holes, significant engine instability was observed. Data such as engine speed and NOx emissions were measured for different engine loads. FIG. 7 is a plot of engine speed, measured in crankshaft rotations per minute (RPM) as a function of engine load, that is, Brake Mean Effective Power (BMEP) measured in bar. FIG. 7 shows that a scattering of speed measurements for various load points. The highest instability was observed at low loads, close to idle operation, where manual adjustments were required to prevent the engine from stopping.

When the engine injection valve was replaced with an injection valve with 6 pilot fuel holes and 7 gaseous fuel holes, the engine operated with less instability. Manual adjustments were not required at low loads.

Figure 8:
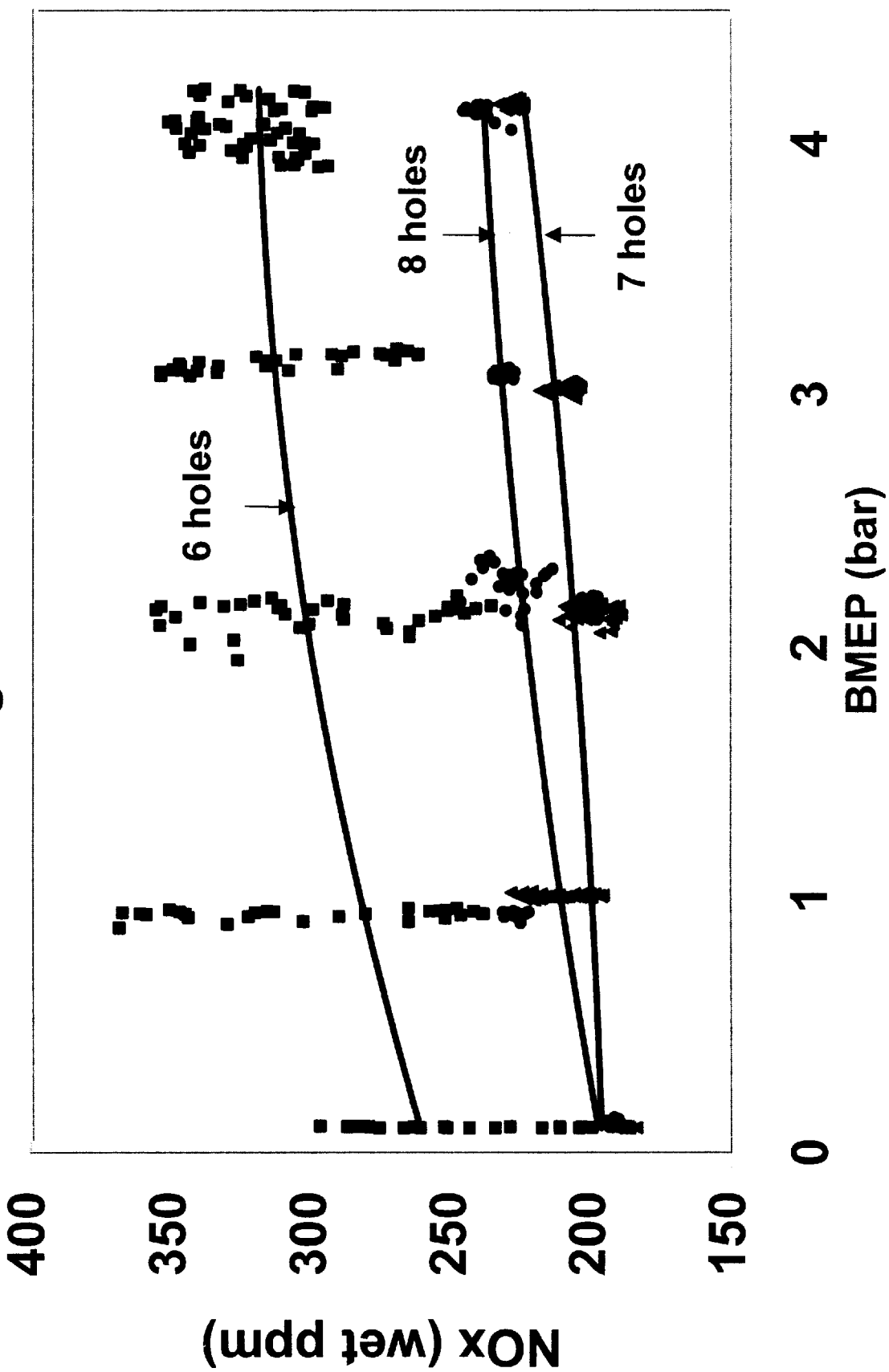
FIG. 8 is a plot of NOx emissions as a function of engine load comparing an engine employing an injection valve with six pilot fuel holes and six gaseous fuel holes to an engine using an injection valve with six pilot fuel holes and seven gaseous fuel holes, and an engine employing an injection valve with six pilot fuel holes and eight gaseous fuel holes. The data for the plots was obtained from experimental results.

FIG. 8 is a plot of NOx emissions, measured in wet ppm as a function of BMEP measured in bar. For the data recorded in FIG. 8, the engine had a constant injection valve with six pilot fuel holes. Squares are used in FIG. 8 to denote the data points that were recorded when the injection valve was equipped with six gaseous fuel holes. The round dots denote the data points that were recorded when the injection valve was equipped with eight gaseous fuel holes. The triangles denote the date points that were recorded when the injection valve was equipped with seven gaseous fuel holes. FIG. 8 shows that there is a broader scattering of the recorded NOx emissions data points when the fuel injection valve with an equal number of pilot fuel and gaseous fuel holes was employed. When the injection valve with seven or eight gaseous fuel holes was used, the data points were more closely grouped. The trend lines further show that the average NOx emissions were higher when an equal number of pilot fuel and gaseous fuel holes were used.

The experiments thus validate the modeling done with numerical simulations and show that unstable engine speed can be attributed to variations of the interlace angle when there is an equal number of gaseous and pilot fuel holes. Such instability can be reduced by using an injection valve that has an unequal number of pilot fuel and gaseous fuel holes. Instability can be further reduced by selecting a number of gaseous fuel holes and pilot fuel holes that do not have any common factors (other than one). By using a statistical analysis to calculate the variance of the average value of the interlace angle, a combination of numbers for the pilot fuel and gaseous fuel holes can be selected so that the variance is less than 0.4 degree$^2$ and preferably less than 0.2 degree$^2$.

While the present invention has been described with reference to a hydraulically actuated gaseous and liquid fuel injection valve, it will be apparent to those skilled in the art that the present invention may also be applied to any gaseous and liquid fuel injection valve with concentric needles that allows independent injection of gaseous and liquid fuels. For example, the present invention may also be applied to gaseous and liquid fuel injection valves that employ piezoelectric or magnetostrictive actuators.

As will be apparent to those skilled on the art in the light of the foregoing disclosure, many alterations and modifications are possible in the practice of this invention without departing form the spirit or scope thereof. Accordingly, the scope of the invention is to be construed in accordance with the substance defined by the following claims.

What is claimed is:

1. A gaseous and liquid fuel injection valve for an internal combustion engine, said fuel injection valve comprising:
   (a) an injection valve body;
   (b) a pilot fuel needle valve assembly disposed within said body, said pilot fuel needle valve assembly comprising a first needle movable in the direction of the longitudinal axis of said body between an open and a closed position for controlling injection of pilot fuel into a combustion chamber of said engine through a plurality of pilot fuel holes formed in a nozzle tip of said pilot needle valve assembly;
   (c) a gaseous fuel needle valve assembly disposed within said body and concentric with said pilot fuel needle valve assembly, said gaseous fuel needle valve assembly comprising a second needle movable in the direction of said longitudinal axis between an open and a closed position for controlling the injection of gaseous fuel into said combustion chamber through a plurality of gaseous fuel holes formed in a nozzle tip of said gaseous fuel needle valve assembly;

wherein at least one of said nozzle tips is rotatable to thereby change the position of said pilot fuel holes with respect to said gaseous fuel holes, and wherein the number of said plurality of pilot fuel holes is different from the number of said plurality of gaseous fuel holes.

2. The fuel injection valve of claim 1 wherein said plurality of gaseous fuel injection holes number N and said plurality of pilot fuel injection holes number M, where N and M do not have common factors other than one.

3. The fuel injection valve of claim 2 wherein at least one of N and M is a prime number.

4. The fuel injection valve of claim 2 wherein N is 7 and M is 6.

5. The fuel injection valve of claim 2 wherein N is 8 and M is 7.

6. The fuel injection valve of claim 2 wherein the absolute value of N−M is equal to an integer selected from the group consisting of one, two, three and four.

7. The fuel injection valve of claim 1 wherein the statistically calculated variance from the average value of the angle between the centerlines of the gaseous fuel holes and pilot fuel holes is less than about 0.4 degree$^2$.

8. The fuel injection valve of claim 1 wherein the statistically calculated variance from the average value of the angle between the centerlines of the gaseous fuel holes and pilot fuel holes is less than about 0.2 degree$^2$.

9. The fuel injection valve of claim 1 wherein said pilot fuel holes and said gaseous fuel holes are equally spaced around the circumference of said respective nozzle tips.

10. The fuel injection valve of claim 1 wherein said gaseous fuel needle valve assembly occupies an annular space formed between said body and said pilot fuel needle valve assembly.

11. The fuel injection valve of claim 10 wherein said pilot fuel needle valve assembly comprises an outer housing that is movable within said body and operates as said second needle for said gaseous fuel needle valve assembly.

12. The fuel injection valve of claim 1 wherein said pilot fuel needle valve assembly and said gaseous fuel needle valve assembly are independently operable at different times to inject pilot fuel and gaseous fuel respectively, directly from said respective valve assemblies into said combustion chamber.

13. The fuel injection valve of claim 1 wherein said first needle is movable to said open position by moving in an inward direction away from said nozzle tip and said combustion chamber.

14. The fuel injection valve of claim 1 wherein said second needle is movable to said open position by moving in an inward direction away from said nozzle tip and said combustion chamber.

15. A method of injecting pilot and gaseous fuel into an internal combustion engine, said engine comprising a combustion chamber and an injection valve associated therewith, said injection valve comprising (1) an injection valve body, (2) a pilot fuel needle valve assembly disposed within said body, said pilot fuel needle valve assembly comprising a first needle that is movable in the direction of the longitudinal axis of said body between an open and a closed position, said pilot fuel needle valve assembly having a plurality of pilot fuel holes formed in a nozzle tip thereof, and (3) a gaseous fuel needle valve assembly disposed within said body and concentric with said pilot fuel needle valve assembly, said gaseous fuel needle valve assembly comprising a second needle that is movable in the direction of said longitudinal axis between an open and a closed position, said gaseous fuel needle valve assembly having a plurality of gaseous fuel holes formed in a nozzle tip thereof, said plurality of pilot fuel holes being different in number from said plurality of gaseous fuel holes, said method comprising:

(a) inducing injection of pilot fuel into said combustion chamber by longitudinal movement of said first needle between open and closed positions;

(b) inducing the injection of gaseous fuel into said combustion chamber by longitudinal movement of said second needle between open and closed positions; and (c) controlling the relative amount of gaseous fuel injected into said combustion chamber with respect to the amount of said pilot fuel by rotational movement of at least one of said nozzle tips.

16. The method of claim 15 wherein said pilot fuel is diesel fuel and said gaseous fuel is natural gas.

* * * * *

UNITED STATES PATENT AND TRADEMARK OFFICE
CERTIFICATE OF CORRECTION

PATENT NO. : 6,439,192 B1
DATED : August 27, 2002
INVENTOR(S) : Patric Ouellette, Alain M.J. Touchette, Guowei Li and Silviu Dumitrescu It is certified that error appears in the above-identified patent and that said Letters Patent is hereby corrected as shown below:

<u>Title page,</u>
Item [56], References Cited, please change:
"       5,996,558  A   *      12/1999      Quellette et al……. 123/506
        6,202,601  B1  *      3/2001       Quellette et al……. 123/27 GE"
to
--      5,996,558  A   *      12/1999      Ouellette et al……. 123/506
        6,202,601  B1  *      3/2001       Ouellette et al……. 123/27 GE --.

<u>Column 9,</u>
Line 47, please change "form" to -- from --.

Signed and Sealed this

Thirty-first Day of December, 2002

JAMES E. ROGAN
*Director of the United States Patent and Trademark Office*